United States Patent
Skaarup Jensen et al.

(10) Patent No.: US 7,390,357 B2
(45) Date of Patent: Jun. 24, 2008

(54) METHOD AND PLANT FOR MANUFACTURING CEMENT CLINKER

(75) Inventors: Lars Skaarup Jensen, Vallensbaek (DK); Jens Peter Hansen, Virum (DK)

(73) Assignee: F.L.Smidth A/S, Valby (DK)

( * ) Notice: Subject to any disclaimer, the term of this patent is extended or adjusted under 35 U.S.C. 154(b) by 693 days.

(21) Appl. No.: 10/526,155

(22) PCT Filed: Jul. 11, 2003

(86) PCT No.: PCT/IB03/03171

§ 371 (c)(1),
(2), (4) Date: Mar. 1, 2005

(87) PCT Pub. No.: WO2004/031092

PCT Pub. Date: Apr. 15, 2004

(65) Prior Publication Data

US 2006/0060112 A1    Mar. 23, 2006

(30) Foreign Application Priority Data

Oct. 2, 2002    (DK) ............................... 2002 01467

(51) Int. Cl.
*C04B 2/10* (2006.01)
(52) U.S. Cl. .................. 106/739; 106/752; 106/761; 432/14; 432/58; 432/106
(58) Field of Classification Search ................ 106/739, 106/752, 761; 432/14, 58, 106
See application file for complete search history.

(56) References Cited

U.S. PATENT DOCUMENTS 4,576,644 A * 3/1986 Goldmann
5,927,967 A * 7/1999 Bauer
6,325,620 B1 * 12/2001 Heinemann
2003/0056935 A1 * 3/2003 Meyer

FOREIGN PATENT DOCUMENTS

EP    0228111 A1 *  7/1987
WO    WO 9310884 A1 *  6/1993

* cited by examiner

*Primary Examiner*—Paul Marcantoni
(74) *Attorney, Agent, or Firm*—Jeffrey S. Melcher; Manelli Denison & Selter, PLLC

(57) ABSTRACT

Described is a method for manufacturing cement clinker by which method cement raw meal is preheated and burned in a plant comprising a cyclone preheater (1) and a kiln (5). The method is peculiar in that that at least a portion of the raw meal is extracted from the cyclone preheater (1), that this raw meal is introduced into a separate unit (21) in which it is given a retention time under oxidating conditions provided by means of a gas stream for forming SO2 and for expelling organic carbon, that the formed SO2 and the expelled organic carbon are subsequently discharged from the separate unit (21) entrained in the gas stream for further treatment in a subsequent process stage, and that the raw meal is reintroduced into the cyclone preheater (1). Hereby is obtained an effective reduction of the VOC, CO as well as the SO2 emission without necessitating utilization of additional energy for heating. By giving the extracted and partially preheated raw meal a retention time under oxidating conditions separate from the cyclone preheater it is obtained that sulphide will oxidate into SO2 and that organic carbon is expelled from the raw meal, so that the thus formed SO2 and the thus expelled organic carbon can be entrained in a separate, relatively small gas stream and subjected to subsequent treatment in the optimum manner.

18 Claims, 3 Drawing Sheets

METHOD AND PLANT FOR MANUFACTURING CEMENT CLINKER

Figure 1:
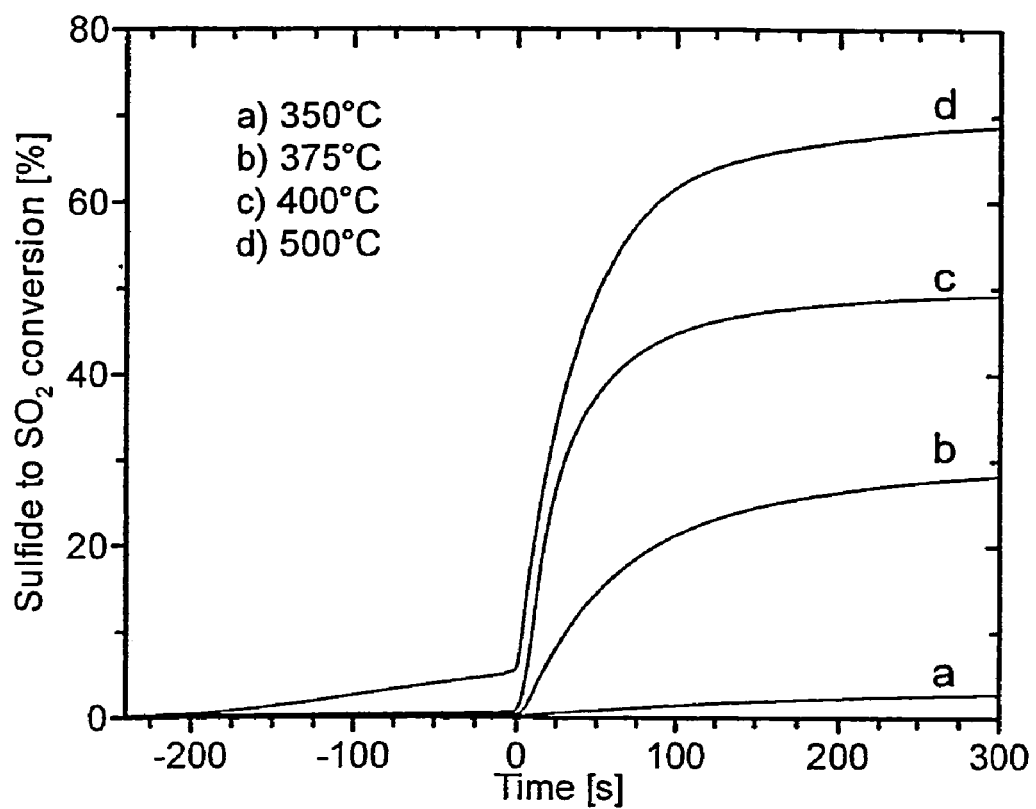

The present invention relates to a method for manufacturing cement clinker by which method cement raw meal is preheated and burned in a plant comprising a cyclone preheater and a kiln. The invention relates specifically to a method for reducing the emission of $SO_2$, CO and volatile organic compounds (hereinafter referred to as VOC) from such a plant. The invention also relates to a plant for carrying out the method.

Plants of the aforementioned kind for manufacturing cement clinker are well known from the literature.

The emission of $SO_2$, CO and VOC from such kiln plants for manufacturing cement clinker emanate primarily from the raw materials which are being used as described in further details in the following text. The heating of the raw meal in the cyclone preheater is done by direct contact with hot exhaust gases according to the counterflow principle, whereby the formed $SO_2$ and CO and the expelled VOC are immediately captured by the exhaust gas stream, and thus leave the cyclone preheater together with the exhaust gas stream in the form of emission. For different reasons, the three types of emission into the atmosphere are undesirable.

The cement raw materials often contain minerals such as pyrite and marcasite. The sulphide in the pyrite ($FeS_2$) is converted in the cyclone preheater at temperatures around 525° C., causing $SO_2$ to be formed. Measurements performed at an operating cement plant have thus shown that virtually all the sulphide contained in the raw meal feed will still be present in the raw meal when it leaves the first cyclone stage at a temperature around 370° C., whereas the sulphide content in the raw meal leaving the second cyclone stage at a temperature around 550° C. will be approximately half as high. So, at the cement plant in question nearly one half of the sulphide contained in the raw materials will escape from the preheater in the form of $SO_2$ as a result of the oxidation process which takes place in the second cyclone stage. A known method for reducing the $SO_2$ level involves application of an absorbent in the form of CaO, Ca $(OH)_2$ or other basic components in the cyclone preheater at a location after, viewed in the direction of flow of the exhaust gases, $SO_2$ is formed so that $SO_2$ can be bound in the raw material in the form of sulphite which is transformed into sulphate at a subsequent process stage. One significant disadvantage of this known method is that it will usually be necessary to apply an excess amount of absorbent, thus making it a relatively expensive method.

Also, the cement raw materials will frequently contain organic carbon which is expelled substantially from the raw meal in the form of CO and VOC during the preheating process in the cyclone preheater and being discharged in unburned form together with the exhaust gas stream. This is confirmed by studies which indicate that certain types of VOC are expelled substantially within a relatively narrow temperature span. One type of VOC is thus expelled substantially within a temperature span ranging from 300 to 500° C., whereas another type is expelled substantially within a temperature span ranging from 450 to 650° C. Other additional types of VOC are expelled over greater temperature spans. In a traditional cyclone preheater the aforementioned temperature span will typically occur in the 1st and 2nd cyclone stage, and, respectively, the 2nd and 3rd cyclone stage, dependent on whether the cyclone preheater is a 4-stage or 5-stage unit and also somewhat dependent upon the efficiency of the other elements of the kiln system. Several methods are known for the subsequent treatment of the exhaust gases for removing VOC from the exhaust gases. A known method comprises the steps, that the exhaust gases from the preheater are reheated in a heat exchange unit, that VOC are burned while fuel is simultaneously added, and that the exhaust gases are subsequently cooled in the heat exchange unit. From the viewpoint of energy consumption this is not an optimum solution, and the apparatus for carrying out the method also involves quite substantial investment costs.

In addition, from Danish patent application No. PA 2001 00009 is known a method by which raw meal is extracted from the preheater and heated in a separate heating unit for forming $SO_2$ and for expelling VOC. According to the known method, the formed $SO_2$ is subsequently brought into contact with an absorbent, the expelled VOC is burned off, and the raw meal is reintroduced into the cyclone preheater. The disadvantage of this known method is primarily that the energy consumption will be relatively high.

It is the objective of the present invention to provide a method as well as a plant for manufacturing cement clinker by which a cheap and effective reduction of $SO_2$, CO and VOC emission can be achieved without any significant impact on the efficiency level of the cyclone preheater.

This is achieved by a method of the kind mentioned in the introduction and being characterized in
that at least a portion of the raw meal is extracted from the cyclone preheater,
that this raw meal is introduced into a separate unit in which it is given a retention time under oxidating conditions provided by means of a gas stream for forming $SO_2$ and for expelling organic carbon,
that the formed $SO_2$ and the expelled organic carbon are subsequently discharged from the separate unit entrained in the gas stream for further treatment in a subsequent process stage, and
that the raw meal is reintroduced into the cyclone preheater.

Hereby is obtained an effective reduction of the VOC, CO as well as the $SO_2$ emission without necessitating utilization of additional energy for heating. By giving the extracted and partially preheated raw meal a retention time under oxidating conditions separate from the cyclone preheater it is obtained that sulphide will oxidate into $SO_2$ and that organic carbon is expelled from the raw meal, so that the thus formed $SO_2$ and the thus expelled organic carbon can be entrained in a separate, relatively small gas stream and subjected to subsequent treatment in the optimum manner. As will be described in further details in the following text, studies carried out by the applicant have surprisingly indicated that a significant oxidation of sulphide into $SO_2$ and a certain expulsion of organic carbon will occur even if the temperature is kept constant and below that at the location in the cyclone preheater where most of the $SO_2$ release is otherwise taking place. The studies have also shown that the rate at which these processes are taking place executed depend on the temperature, and that the rate will be increased in step with rising temperatures.

The plant for carrying out the method according to the invention is characterized in that it comprises means for extracting at least a portion of the raw meal from the cyclone preheater, separate means for giving this raw meal a retention time under oxidating conditions and thereby ensuring oxidation, by means of a gas stream, of sulphide contained in this raw meal for the formation of $SO_2$ and for the expulsion of organic carbon, means for discharging the formed $SO_2$ and the expelled organic carbon from the separate unit entrained in the gas stream for further treatment in a subsequent process stage, and means for reintroducing the raw meal into the cyclone preheater.

Further characteristic features of the plant will be apparent from the detailed description provided in the text below.

It is preferred that all of the raw meal is extracted from the cyclone preheater for oxidation in the separate unit.

Up to this point in time, conventional wisdom has held that when the raw materials contain sulphurous components, $SO_2$ will be formed within a relatively small temperature span around 525° C. The studies referred to above and described in further details in the following text have, however, quite surprisingly indicated that a significant oxidation of sulphide into $SO_2$ will occur even at lower temperatures if only the necessary time is allocated for the process. The studies have thus shown that the formation of $SO_2$ may occur even at a temperature of 350° C., and according to the invention the raw meal may thus be extracted from the cyclone preheater at a temperature ranging between 350° C. and 525° C. In order to limit the necessary time of retention for the extracted raw meal in the separate unit and thus its capacity, it is preferred that the raw meal is extracted from the cyclone preheater at a temperature within the range of 400° C. and 500° C. The studies carried out have indicated that at temperatures higher than 525° C., $SO_2$ will be formed so rapidly that virtually all of the sulphide has been converted into $SO_2$ before the raw meal is extracted from the preheater.

In principle, the raw meal can be given any retention time in the separate unit which is necessary to attain the desired $SO_2$ formation at the temperature in question. In actual practice, the temperature of the extracted raw meal will be the main determinant for the duration of the retention time, which is necessary. According to the invention the retention time in the separate unit may be selected at random, but, often, it should advantageously be within the range of 10 to 200 seconds. However, it is preferred that a maximum limit of 100 seconds is applied.

The temperature in the separate unit can be kept substantially constant during the oxidation process, but it may also be varied, for example through regulation of the temperature of the gas stream introduced into the separate unit. If it is desirable to increase the rate of oxidation, the temperature in the separate unit may thus be elevated by introducing a hotter gas stream.

In principle, organic carbon is expelled from the raw meal across the entire temperature span in the cyclone preheater, which in the case of the raw meal ranges from a temperature of less than 100° C. at the top of the cyclone preheater to a temperature close to 830° C. at the bottom of the cyclone preheater. Therefore, the method according to the invention will only have the capability to expel a portion of the total amount of organic carbon. The temperature at which the raw meal is to be extracted will therefore depend primarily on the temperature at which the maximum reduction of the $SO_2$ level is achieved. The studies previously referred to in the text have indicated variations in the pattern for expelling different types of organic carbon. Prior to implementation of the method according to the invention at a given cement plant it will, therefore, be advantageous to conduct specific investigations of the raw materials utilized in order to determine exactly their content of different types of organic carbon and further to determine how these are expelled as a function of the temperature. In some cases, where consistent with the $SO_2$ reduction, it is, therefore, preferred that the raw meal is extracted from the cyclone preheater at a temperature of less than 450° C.

In principle, the oxidation of the extracted raw meal in the separate unit can be done in any suitable manner, however, a smaller oxygen-containing gas stream must be led through the compartment for oxidation of sulphide and organic carbon and for the removal of $SO_2$ and expelled organic carbon. Studies have indicated that the optimum oxygen percentage for removing $SO_2$ is approximately 5 per cent.

The separate unit may be configured in any suitable manner. The separate unit may comprise any type of receptacle or conveying mechanism for bulk materials, which will be able to provide a sufficient retention time for the raw meal and ensure a sufficient mixing of the raw meal and the oxygen-containing gas stream. For example, the separate unit may be configured as a rotary drum in which the extracted raw meal and the oxygen-containing gas stream are introduced via inlets located at either end of the rotary drum, passed through the rotary drum in counter-current flow and also discharged from opposite ends. Furthermore, it is desirable that the unit or plant comprises means for ensuring that the raw meal after its extraction from the unit will be physically located at, or can be routed to, the level which is necessary for it to be reintroduced at the designated location into the cyclone preheater.

The formed $SO_2$ which is discharged from the separate unit entrained in the gas stream can be separately treated in, for example, a wet scrubber of known operating principle where $SO_2$ on reaction with $CaCO_3$ and $H_2O$ will be transformed into gypsum on the form $CaSO_4.2H_2O$, and from where the cleaned gas can be released to the environment. The necessary $CaCO_3$ may be contained in the dust carried along from the separate oxidation unit or it may be supplied in the form of fresh raw meal. Due to the fact that the gas stream through the separate oxidation unit is small relative to the gas stream through the cyclone preheater, the wet scrubber for this purpose may also be relatively small. The water consumption will also be relatively small. The gypsum generated in the wet scrubber may advantageously be used at the cement mill plant in substitution for some of the ordinary gypsum. In this way a significant amount of sulphur may be bypassed the kiln system of the cement plant, thereby reducing the frequently occurring problems in respect of clogging and obstruction in the kiln system.

The formed $SO_2$ which is discharged from the separate unit entrained in the gas stream may alternatively be introduced into the cyclone preheater at a location where a sufficient amount of absorbent in the form of CaO and/or other basic components is present, which will typically be at the lower end of the cyclone preheater. In plants where the cyclone preheater comprises a calciner it is preferred that the formed $SO_2$ is introduced into the said calciner.

The expelled organic carbon can be burned separately or alternatively it may be reintroduced at a location in the cyclone preheater where the temperature is at least 700° C., which will typically be at the lower end of the preheater. In plants where the cyclone preheater comprises a calciner it is preferred that the expelled organic carbon is introduced into the said calciner.

In principle, the extracted and separately oxidized raw meal can be reintroduced into the cyclone preheater at any location. However, it should preferably be introduced immediately after the point of raw meal extraction, viewed in the direction of flow of the raw meal. In other words, it is preferred that the separately oxidized raw meal is introduced into the cyclone preheater at the first cyclone stage after the cyclone stage from which it was extracted.

Figure 2:
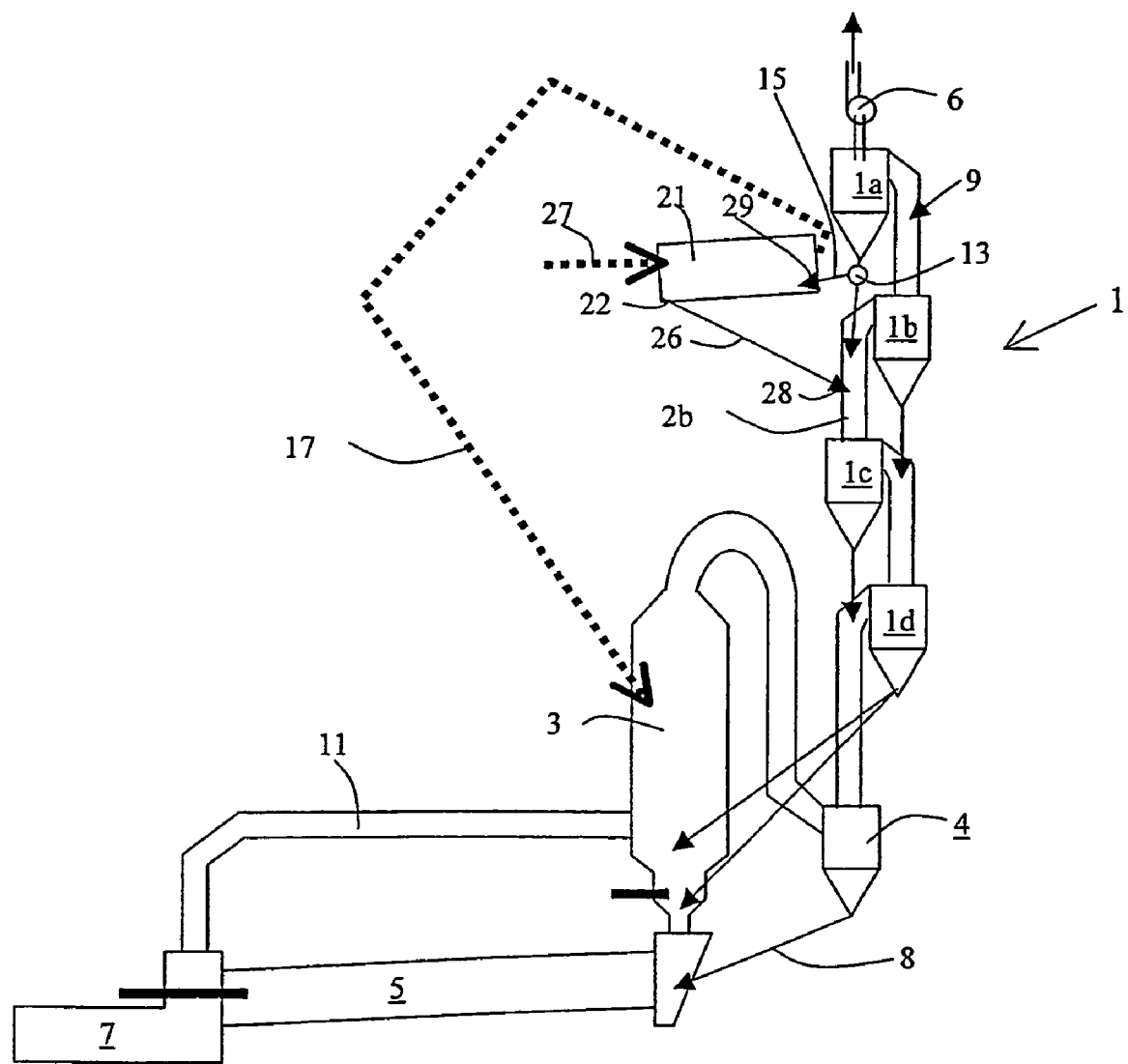
Figure 3:
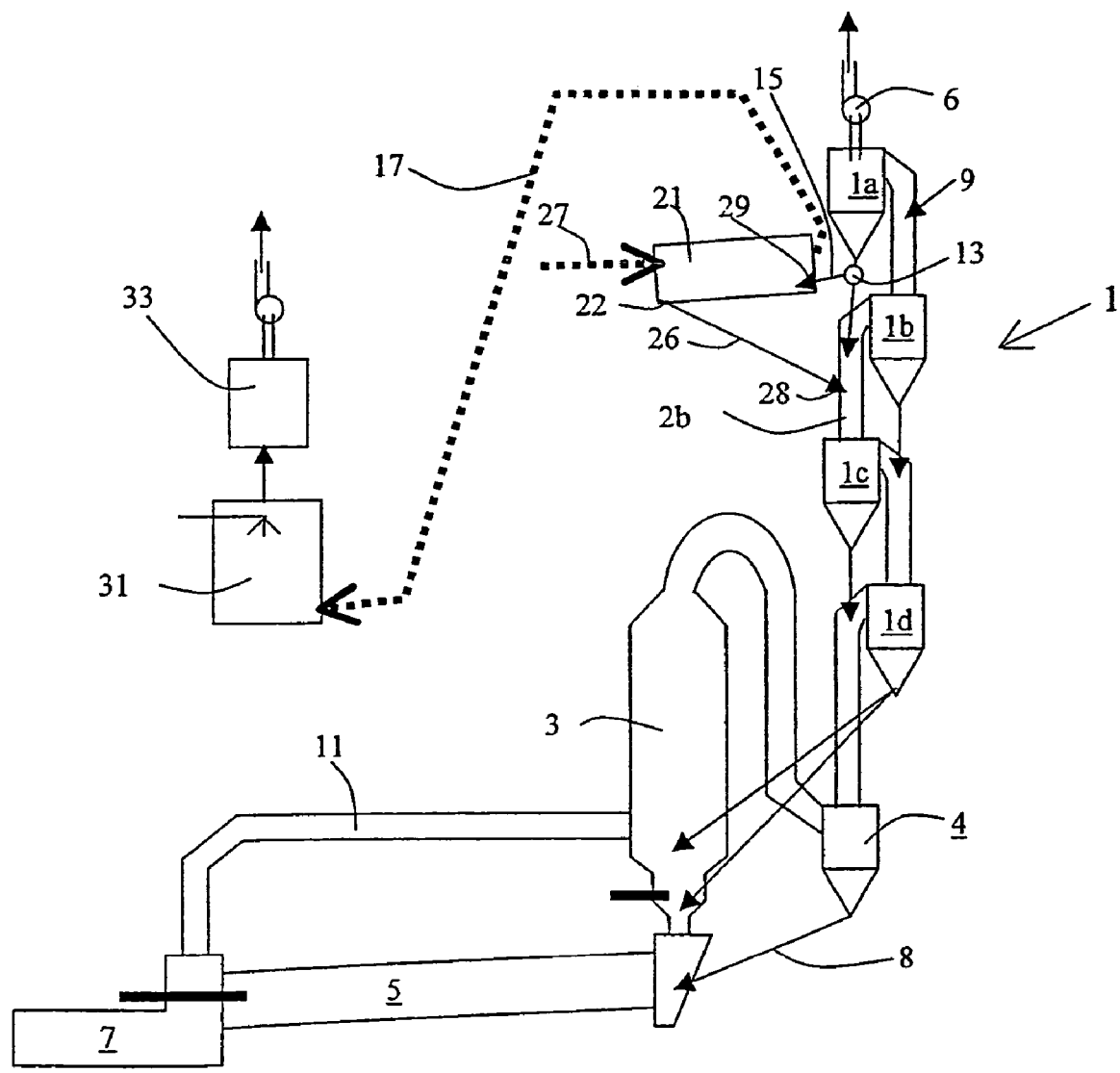

The invention will now be described in further details with reference to the drawing, being diagrammatical, and in which FIG. 1 shows a graphic representation of the formation of $SO_2$ as a function of the time at different temperatures, FIG. 2 shows a first example of a plant according to the invention, and FIG. 3 shows a second example of a plant according to the invention.

Seen in FIG. 1 are graphs a-d for the formation of $SO_2$ as a function of the time at the temperatures 350, 375, 400 and 500° C. The illustrated graphs are a direct result of a series of tests which have been conducted by the applicant. The tests have been conducted in a fixed bed reactor according to the method described in the following. A material sample was preheated to a desired temperature in an inert hot gas consisting of pure $N_2$. The hot exit gas from the inert heating process was mixed with $O_2$ in order to oxidate any evaporated sulphur into $SO_2$. Following inert heating during a period of 240 seconds, $O_2$ was added to the $N_2$ stream before the stationary bed. This procedure was followed to make certain that there would not be any significant oxidation of the material sample during the relatively slow heating process and that the supply of $O_2$ would take place swiftly relative to the chemical reaction so that the rate of reaction could be studied at a given temperature and independently of the heating process. The $SO_2$ content as a function of the time was measured throughout the test procedure. In FIG. 1 that part of the graphs where t is less than 0 shows the $SO_2$ formation which occurs in connection with the heating of the material in the inert gas whereas the graphs for t greater than 0 show the $SO_2$ formation when the temperature is kept constant and when $O_2$ is supplied. It clearly appears from the figure that the formation of $SO_2$ is a very slow process during the inert heating process up to the point where t is equal to 0 and that subsequently, when $O_2$ is supplied when t is equal to 0 the formation rate is much faster. In particular the graphs b, c and d show that the conversion of sulphide into $SO_2$ takes place predominantly within the initial 100-second period whereafter the graphs are levelled out, presumably trending towards maximum conversion which, in respect of the material being used during the test, will be approximately 30, 50 and 70 percent, respectively, at the respective temperatures 375, 400 and 500° C. So, out of these three temperatures the immediate conclusion would be that the optimum method would involve extraction of the raw material at a temperature around 500° C. since the highest degree of conversion is achieved at this temperature. However, it should be noted that in connection with the heating to a level of 500° C. in the inert gas, a quite significant amount of $SO_2$ will be formed which in actual practice will not be transferred to the separate unit. So, the optimum temperature for extracting the material in question seems to be within the range of 400° to 500° C.

In FIGS. 2 and 3 are seen two examples of plants according to the invention. Both of the plants shown comprise a cyclone preheater 1, a rotary kiln 5 and a clinker cooler 7. The cyclone preheater 1 comprises four cyclone stages a-d, a calciner 3 and a separation cyclone 4. The cyclone preheater 1 may comprise fewer as well as more than the four cyclones indicated. Raw meal from a not shown raw mill plant is introduced into the cyclone preheater via one or several inlets 9 and preheated in a counter-current arrangement with exhaust gases whereafter it is separated from the cyclone preheater in the cyclone d and directed to the calciner 3 in which it is calcined. From the bottom outlet of the separation cyclone 4, the calcined raw meal is then directed via a duct 8 to the rotary kiln 5 in which it is burned into cement clinker which is subsequently cooled in the clinker cooler 7. The exhaust gases from the rotary kiln 5 and the calciner 3 are drawn through the cyclone 4 and then up through the cyclone preheater by means of a fan 6. Tertiary air from the clinker cooler 7 is introduced via a duct 11 into the calciner 3.

According to the invention at least some of the raw meal is extracted from the cyclone preheater 1 with a view to subjecting it to oxidation in a separate unit 21 in which the raw meal is introduced via a duct 15. In order for the separate oxidation of the raw meal to have any significant effect upon the formation of $SO_2$ and the expulsion of organic carbon, the raw meal must of course be extracted from the preheater before the majority of the sulphide content has been transformed into $SO_2$ and/or before the content of organic carbon has been expelled from the material. In instances where it is only desirable to carry out separate oxidation of some of the raw meal, it can be extracted from the raw meal flow from the bottom outlet of the selected cyclone stage via, for example, a splitter gate 13.

The separate unit 21 shown in FIGS. 2 and 3 comprises a rotary drum 21. A gas stream is introduced via an inlet 27 at one end of the rotary drum and the extracted raw meal is introduced via an inlet 29 at the opposite end, causing the mixing of the raw meal and the gas stream to be effected in a counterflow arrangement. The raw meal is extracted from the other end of the rotary drum 21 via an outlet 22 and directed via a duct 26 and transport means, if any, back to the cyclone preheater 1 into which it is reintroduced via an inlet 28 which is located immediately after the point at which it was extracted, viewed in the direction of flow of the raw meal.

In the embodiment shown in FIG. 2 the gas stream containing $SO_2$ and the expelled organic carbon is led from an outlet 29 in the rotary drum 21 via a duct 17 to the calciner 3 in which all organic carbon is burned off and $SO_2$ is absorbed under optimum temperature conditions by reaction primarily with CaO.

In the embodiment shown in FIG. 3 the gas stream containing $SO_2$ and the expelled organic carbon is led from the outlet 29 in the rotary drum 21 via the duct 17 to a wet scrubber 31 in which it is cleaned according to known principles where $SO_2$ by reaction with $CaCO_3$ and $H_2O$ will be transformed into gypsum on the basis of the form $CaSO_4.2H_2O$, and from where the cleaned gas can be released to the environment, possibly via a unit 33 for burning CO and VOC.

In connection with the implementation of the invention at an existing cement plant it will often be necessary to set the temperature in the preheater at a level which will allow the raw meal to be extracted at the desired temperatures. This can be done in a number of ways. If it is desirable to lower the temperature at the specific location in the preheater where the raw meal is to be extracted for the separate oxidation, it will be possible to introduce, for example, atmospheric air at an appropriate location. However if it is desirable to raise the temperature at the specific point of extraction, the raw meal feed may, for example, be split up and a smaller quantity of raw meal may be bypassed. Also, the temperature can be adjusted by controlling the quantity of raw meal being extracted for the separate oxidation. Other means of regulation consist in a modification or regulation of the separation efficiency of the preheater cyclones.

In actual practice it may be necessary to regulate the capacity of the separate unit 21 and in the case of a rotary drum this may be done by changing its rotational speed. An increase in the rotational speed of the rotary drum will lead to a reduction in the retention time of the raw meal in the drum, entailing a corresponding reduction in the amount of $SO_2$ being formed and the organic carbon being expelled. In order to compensate for any such reduction, heat may be supplied to the separate unit 21, possibly by introducing a partial flow stream of the hot air from the clinker cooler 7 into the unit 21 via the inlet 27.

The invention claimed is:

1. A method for manufacturing cement clinker comprising:
preheating and burning cement raw meal in a plant comprising a cyclone preheater and a kiln;
extracting at least a portion of the raw meal from the cyclone preheater;
introducing the raw meal into a separate unit in which the raw meal is given a retention time under oxidating conditions provided by means of a gas stream for forming SO2 and for expelling organic carbon;
discharging the formed SO2 and the expelled organic carbon from the separate unit entrained in a gas stream for further treatment in a subsequent process stage; and
reintroducing the raw meal into the cyclone preheater.

2. The method according to claim 1, wherein all of the raw meal is extracted from the cyclone preheater for oxidation in the separate unit.

3. The method according to claim 1, wherein the raw meal is extracted from the cyclone preheater at a temperature between 350° C. and 525° C.

4. The method according to claim 2, wherein the raw meal is extracted from the cyclone preheater at a temperature between 350° C. and 525° C.

5. The method according to claim 1, wherein the raw meal is extracted from the cyclone preheater at a temperature between 400° C. and 500° C.

6. The method according to claim 2, wherein the raw meal is extracted from the cyclone preheater at a temperature between 400° C. and 500° C.

7. The method according to claim 1, wherein the temperature in the separate unit is kept substantially constant during the oxidation process.

8. The method according to claim 2, wherein the temperature in the separate unit is kept substantially constant during the oxidation process.

9. The method according to claim 1, wherein the raw meal is given a retention time in the separate unit within the range of 10 to 200 seconds.

10. The method according to claim 2, wherein the raw meal is given a retention time in the separate unit within the range of 10 to 200 seconds.

11. The method according to claim 1, wherein the raw meal is given a retention time in the separate unit within the range of 10 to 100 seconds.

12. The method according to claim 2, wherein the raw meal is given a retention time in the separate unit within the range of 10 to 100 seconds.

13. The method according to claim 1, wherein the that the formed SO2 and the expelled organic carbon, and which is discharged from the separate unit, is introduced into a calciner of the cyclone preheater.

14. The method according to claim 2, wherein the that the formed SO2 and the expelled organic carbon, and which is discharged from the separate unit, is introduced into a calciner of the cyclone preheater.

15. The method according to claim 1, wherein the extracted and separately oxidated raw meal is introduced into the cyclone preheater immediately after the point where it was extracted, viewed in the direction of flow of the raw meal.

16. The method according to claim 2, wherein the extracted and separately oxidated raw meal is introduced into the cyclone preheater immediately after the point where it was extracted, viewed in the direction of flow of the raw meal.

17. A plant for manufacturing cement clinker comprising a cyclone preheater; a kiln, means for extracting at least a portion of the raw meal from the cyclone preheater; separate means for giving the raw meal a retention time under oxidating conditions and thereby ensuring oxidation by means of a gas stream of sulphide contained in this raw meal for the formation of SO2 and for the expulsion of organic carbon; means for discharging the formed SO2 and the expelled organic carbon from the separate unit entrained in a gas stream for further treatment in a subsequent process stage; and means for reintroducing the raw meal into the cyclone preheater.

18. The plant according to claim 17, further comprising a wet scrubber for treatment of the formed SO2, which is discharged from the separate unit entrained in the gas stream.

* * * * *